United States Patent
Nielsen et al.

(10) Patent No.: US 7,204,867 B2
(45) Date of Patent: Apr. 17, 2007

(54) HIGH PRESSURE GAS PROCESSING CONFIGURATIONS AND METHODS

(75) Inventors: Richard B. Nielsen, Laguna Niguel, CA (US); John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 162 days.

(21) Appl. No.: 10/478,390

(22) PCT Filed: Nov. 25, 2002

(86) PCT No.: PCT/US02/38107

§ 371 (c)(1),
(2), (4) Date: Mar. 4, 2005

(87) PCT Pub. No.: WO2004/047956

PCT Pub. Date: Jun. 10, 2004

(65) Prior Publication Data

US 2005/0211092 A1    Sep. 29, 2005

(51) Int. Cl.
*B01D 53/14* (2006.01)

(52) U.S. Cl. ............................ 95/231; 95/236; 95/237; 96/243

(58) Field of Classification Search .................. 95/214, 95/230–254; 166/266, 267, 271, 268, 305.1, 166/401, 402, 403
See application file for complete search history.

(56) References Cited

U.S. PATENT DOCUMENTS

| 5,520,249 A | * | 5/1996 | Minkkinen et al. ......... 166/266 |
| 5,769,165 A | * | 6/1998 | Bross et al. ................ 166/266 |
| 6,183,540 B1 | * | 2/2001 | Thonsgaard ................ 95/166 |
| 6,203,599 B1 | * | 3/2001 | Schubert et al. ............. 95/172 |
| 2005/0000359 A1 | * | 1/2005 | Wyschofsky et al. ......... 95/230 |

* cited by examiner

*Primary Examiner*—Duane Smith
*Assistant Examiner*—Robert Clemente
(74) *Attorney, Agent, or Firm*—Rutan & Tucker, LLP (57) ABSTRACT

Contemplated plants comprise an acid gas removal unit that receives a compressed gas from an injection gas compressor, wherein acid gas is removed from the compressed gas in the acid gas removal unit at a pressure approximately above pipeline pressure.

25 Claims, 4 Drawing Sheets

FIGURE 4

# HIGH PRESSURE GAS PROCESSING CONFIGURATIONS AND METHODS

FIELD OF THE INVENTION

The field of the invention is gas processing, especially as it relates to gas treating at high pressures, and delivery of high pressure gas to sales gas pipelines and injection wells.

BACKGROUND OF THE INVENTION

Numerous hydrocarbon reservoirs contain large volumes of gas associated with crude oil and hydrocarbon condensate. To produce a liquid hydrocarbon fraction for further processing, the associated gas is separated from the liquid hydrocarbons in a oil/gas production facility while the associated gas is often injected back to the hydrocarbon reservoir.

Where the oil/gas production facility is relatively close to a consumer, at least part of the associated gas may be further treated to the customer's specifications. On the other hand, where sale or other commercial use for the associated gas is not cost effective, the associated gas is frequently injected into a suitable formation to maintain a relatively steady rate of oil production. Alternatively, an oil/gas production facility may combine sale of one portion of associated gas with injection of another portion of the associated gas. However, as the gas injection pressure is typically at a much higher pressure than the sales gas pressure (e.g., 1500 psi to 3000 psi higher), separate injection gas compressors and sales gas compressors are normally required. Moreover, the rate of oil production depends to a significant degree on the sales gas demand. Consequently, when the sales gas demand declines, less associated gas is produced thereby reducing the oil production rate. To circumvent at least some of the problems associated with a reduced rate of sales gas, excess associated gas may be flared to maintain a relatively high production rate of liquid hydrocarbons. Flaring of associated gas, however, is environmentally problematic.

Among other obstacles, the relatively high cost of sales gas production from associated gas has a negative impact on commercial use of associated gas. For example, in most known methods of treating associated gas for sales gas production, the associated gas is first treated to remove acid gases, then dehydrated, and finally compressed to the sales gas pressure. Moreover, in cold climate environments, the sales gas must also be refrigerated to protect the permafrost. Such methods are relatively expensive, particularly when existing injection gas compression equipment is converted to sales gas compression (e.g., re-wheeling of injection gas compressors is often difficult and typically requires shutdown of at least part of the facility). The difficulties of such oil/gas facilities are often compounded by the use of an activated amine for acid gas removal. Activated amine solvents typically require extensive heating and cooling for absorption and regeneration, thereby adding significant cost and energy consumption. Moreover, activated amine solvents are often prone to freezing due to their high water content.

Therefore, although various configurations and methods for separation and processing of various hydrocarbon materials are known in the art, numerous problems still persist, especially where such configurations and methods are upgraded from associated gas injection mode to a combined mode where at least some of the associated gas is processed and sold to a consumer. Consequently, there is still a need for improved configurations and methods of gas processing.

SUMMARY OF THE INVENTION

The present invention is directed to configurations and methods of gas treating in which an acid gas component of a gas, and most preferably of an associated gas, is removed at or about pipeline pressure (e.g., at about 1500 psig to about 2500 psig). In particularly preferred configurations and methods, the flow rate of an associated gas (and with this the flow rate of a crude hydrocarbon product) may be maintained substantially constant at substantially variable sales gas flow rates.

In one aspect of the inventive subject matter, a plant includes an acid gas removal unit that receives a portion of a dehydrated and $C5^+$ depleted gas from an injection gas compressor at a pressure above a pipeline pressure, wherein the dehydrated and C5+ depleted gas comprises a sales gas and an acid gas, and wherein the acid gas is removed by a physical or chemical solvent in the acid gas removal unit. In even more preferred configurations, the dehydrated and $C5^+$ depleted gas (and yet more preferably $C4^+$ depleted gas) has a carbon dioxide content of at least 10 mol % and a water dew point of about $-40°$ F., while the physical solvent is selected from the group of propylene carbonate, a morpholine solvent, and a dimethylether of polyethylene glycol, and the chemical solvent comprises MDEA (e.g., activated MDEA) or other suitable amines.

In such configurations, the pipeline pressure is at least 2300 psig, and/or the dehydrated and $C5^+$ depleted gas is let down in pressure (e.g., via turbo expander) to about pipeline pressure before the acid gas is removed in the acid gas removal unit. Thus, it should be recognized that the acid gas removal unit operates at a lower than the pipeline pressure. In further preferred aspects, the $C5^+$ depleted gas that leaves the acid gas removal unit is compressed to the pipeline pressure by power generated from the turbo expander, and the $C5^+$ depleted gas that leaves the acid gas removal unit may be used as a refrigerant. In still further contemplated configurations, such plants may further include a bypass that receives a portion of the dehydrated and $C5^+$ depleted gas from the injection gas compressor at a pressure above pipeline pressure, wherein the portion of the dehydrated and C5+ depleted gas is injected to a reservoir formation (the portion of the dehydrated and $C5^+$ depleted gas may be up to 100% of the total flow rate of the dehydrated and $C5^+$ depleted gas). As with the additionally contemplated configurations below, it is generally preferred that the acid gas that is removed by the acid gas removal unit is compressed and injected to a reservoir formation.

In another aspect of the inventive subject matter, a plant may include an injection gas compression unit that receives a dehydrated gas comprising an acid gas and compresses the dehydrated gas to an injection pressure, thereby forming a compressed gas, wherein an acid gas removal unit receives a first portion of the compressed gas, wherein at least some of the acid gas is removed in the acid gas removal unit at at least pipeline pressure using a physical or chemical solvent to form a sales gas, and wherein the sales gas is fed to a pipeline, the removed acid gas is compressed and injected to a reservoir formation, and wherein optionally a second portion of the compressed gas is injected to the reservoir formation for disposal or enhanced oil recovery. With respect to the dehydrated gas, the sales gas pipeline pressure, and the physical or chemical solvent, the same considerations as contemplated above apply.

In yet another aspect of the inventive subject matter, a plant may include a hydrocarbon source that provides at a production rate a crude hydrocarbon product and an associated gas comprising a sales gas and an acid gas, and an injection gas compression unit that receives and compresses at least a portion of the associated gas, thereby producing a compressed associated gas. Such contemplated plants will further comprise an acid gas removal unit that is fluidly coupled to the injection gas compression unit and receives at least part of the compressed associated gas via JT valve or turbo expander, and a bypass that is fluidly coupled to the injection gas compression unit to receive a portion of the compressed associated gas, thereby rendering the production rate of the crude hydrocarbon product independent from the flow rate of the sales gas. While not limiting to the inventive subject matter, it is generally preferred that such plants further comprise an oil/gas production facility in which the associated gas is dehydrated and $C5^+$ depleted to form a treated gas with a carbon dioxide content of at least 10 mol % and a water dew point of about −40° F. Moreover, it is generally preferred that the injection gas compression unit compresses the treated gas to a pressure above a sales gas pipeline pressure (e.g., about 3500 psig). Thus it should be recognized that the acid gas removal unit may operate at or below a pressure of about sales gas pipeline pressure.

Various objects, features, aspects and advantages of the present invention will become more apparent from the following detailed description of preferred embodiments of the invention, along with the accompanying drawings in which like numerals represent like components.

DETAILED DESCRIPTION

The inventors discovered that sales gas can be produced from high-pressure (e.g., greater than 3500 psig) associated gas, wherein acid gas is removed from the associated gas at a pressure that is at about or above pipeline pressure for medium-pressure and high-pressure gas pipelines. Contemplated configurations and methods are particularly useful where an oil/gas production facility has an injection compressor and is retrofitted to produce a sales gas from at least a portion of the associated gas.

The term "associated gas" as used herein refers to gaseous hydrocarbons predominantly containing C1 to C4 components that are recovered from a natural hydrocarbon reservoir along with crude oil. In contrast, the term "sales gas" as used herein refers to a processed gas that is formed from associated gas by removing at least a portion of the acid gas contained in the associated gas. However, it should be recognized that the sales gas may be further processed to remove, among other things, water, aromatic compounds, and/or sulfur containing compounds.

As also used herein, the term "medium-pressure" refers to a pressure within the range of about 1200 psig to about 1700 psig, while the term "high-pressure" refers to a pressure within the range of about 2200 psig to about 2700 psig, and even higher. As further used herein, the term "about" when used in conjunction with numeric values refers to an absolute deviation of less than or equal to 10% of the numeric value, unless otherwise stated. Therefore, for example, the term "about 1000 psig" includes a range from 900 psig (inclusive) to 1100 psig (inclusive).

Figure 1:
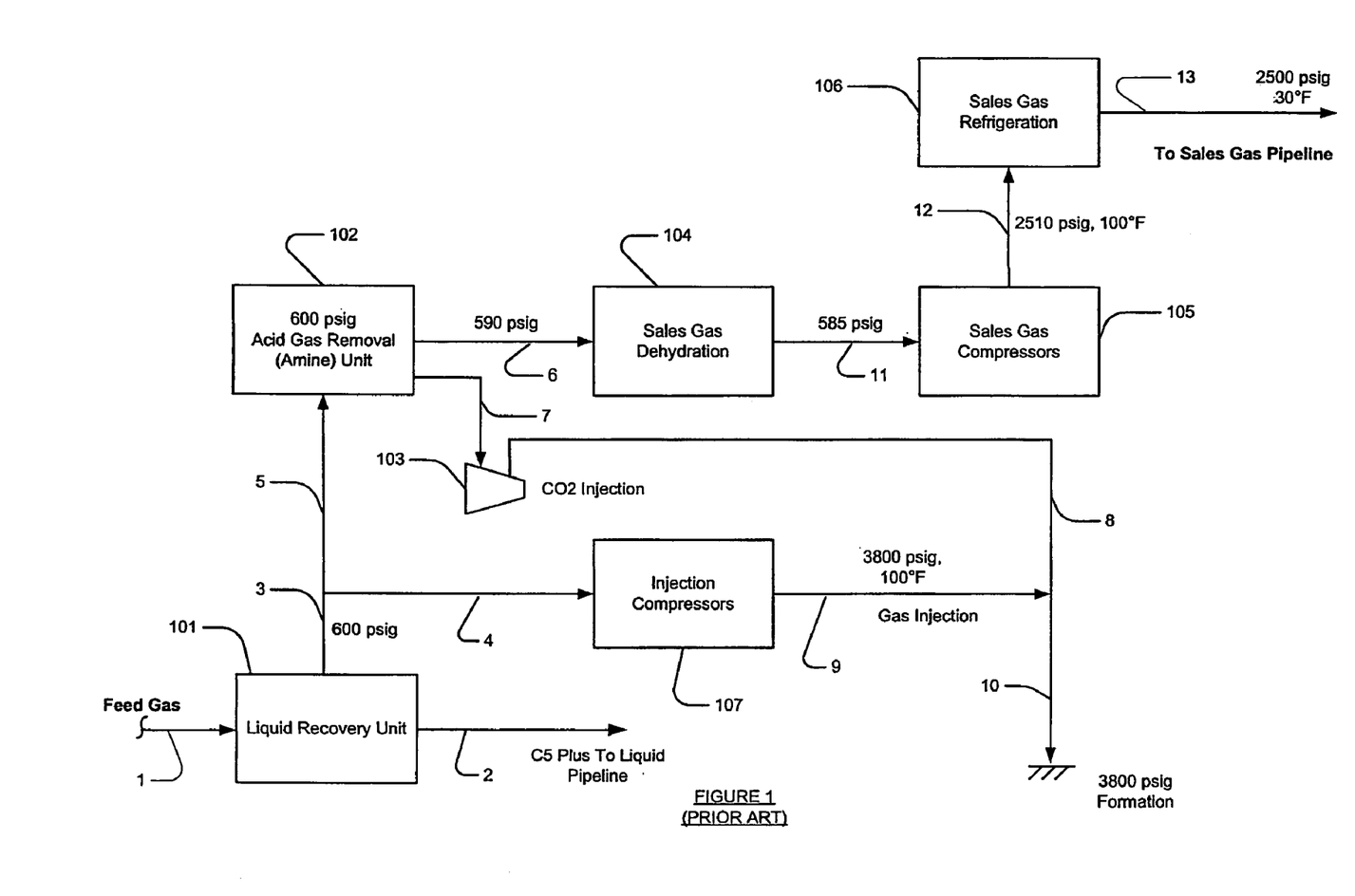
FIG. 1 is a prior art schematic of a configuration with parallel independent injection gas compression and sales gas treating and compression, in which an amine treating unit is upstream of a sales gas compressor.

To illustrate particular advantages and differences of the inventive configurations and methods over known processes, prior art FIG. 1 is provided in which a processing plant has a configuration with parallel independent injection gas compression and sales gas treating/compression, and in which an amine treating unit is upstream of a sales gas compressor. Here, the feed gas (stream 1) is an associated gas from a crude oil production facility with a typical flow rate of about 8 BSCFD and at a feed pressure of about 600 psig. The feed gas is first processed in a liquid recovery unit 101 in which the feed gas is dehydrated to −40° F. water dew-point and in which most of the $C5^+$ components are removed. The liquid recovery unit typically uses a lean oil absorption unit for the removal of the heavier hydrocarbons, which are recovered as stream 2.

The so formed $C5^+$ depleted gas (stream 3) from the liquid recovery unit is split into two portions, streams 4 and 5, which are separately used for gas injection and for sales gas production. Stream 4 at a flow rate of about 4 BSCFD and is compressed by the injection gas compressor 107 to form stream 9 at 3800 psig for injection into the reservoir formation (alone, or after combination with compressed CO2 as stream 10). Stream 5 at a flow rate of 4 BSCFD is treated for removal of carbon dioxide in an acid gas removal unit 102 operating at about 600 psig that typically employs an activated MDEA absorption process. The term "activated MDEA" refers to a solvent comprising MDEA (methyldiethanolamine) and at least one primary and/or secondary amine, or piperazine. Treated gas (stream 6) leaving the acid gas removal unit is typically saturated with water from the absorption process. A sales gas dehydration unit 104 removes most of the water to form treated and dehydrated sales gas stream 11, which is compressed using sales gas compressors 105 to about 2500 psig (where a high-pressure pipeline is employed). The compressed sales gas 12 leaving the sales gas compressors has typically a temperature of about 100° F., which requires in a cold environment further cooling to about 30° F. in a sales gas refrigeration unit 106 to protect a permafrost layer. The so cooled and compressed sales gas is then transported to a high-pressure pipeline via stream 13. The carbon dioxide stream (stream 7) is dried and compressed in the $CO_2$ injection compressor 103 to form stream 8 for injection to the reservoir formation, typically at 3800 psig (and typically in combination with compressed associated gas stream 9).

It should be particularly appreciated that the activated MDEA absorption process requires extensive heating and cooling for solvent regeneration. Moreover, the water losses from the MDEA absorption unit are relatively high as the treated gas (stream 6) and the carbon dioxide stream (stream 7) are saturated with water. Consequently, a relatively large quantity of makeup water is required to maintain proper solvent concentration.

Still further, it should be appreciated that in such configurations (using parallel injection gas compression and sales gas compression) fluctuations in the flow rate of the injection gas branch (stream 4) and/or the sales gas branch (stream 5) will adversely affect the overall flow rate of the associated gas, and therefore the overall oil production rate. Typically, the flow rate for the injection gas branch is relatively constant. Thus, fluctuations, and particularly a drop in the sales gas market (and concomitant drop in sales gas production) will reduce the flow rate of the associated gas and therefore the rate of oil production (resulting in substantial losses in product revenue).

Figure 2:
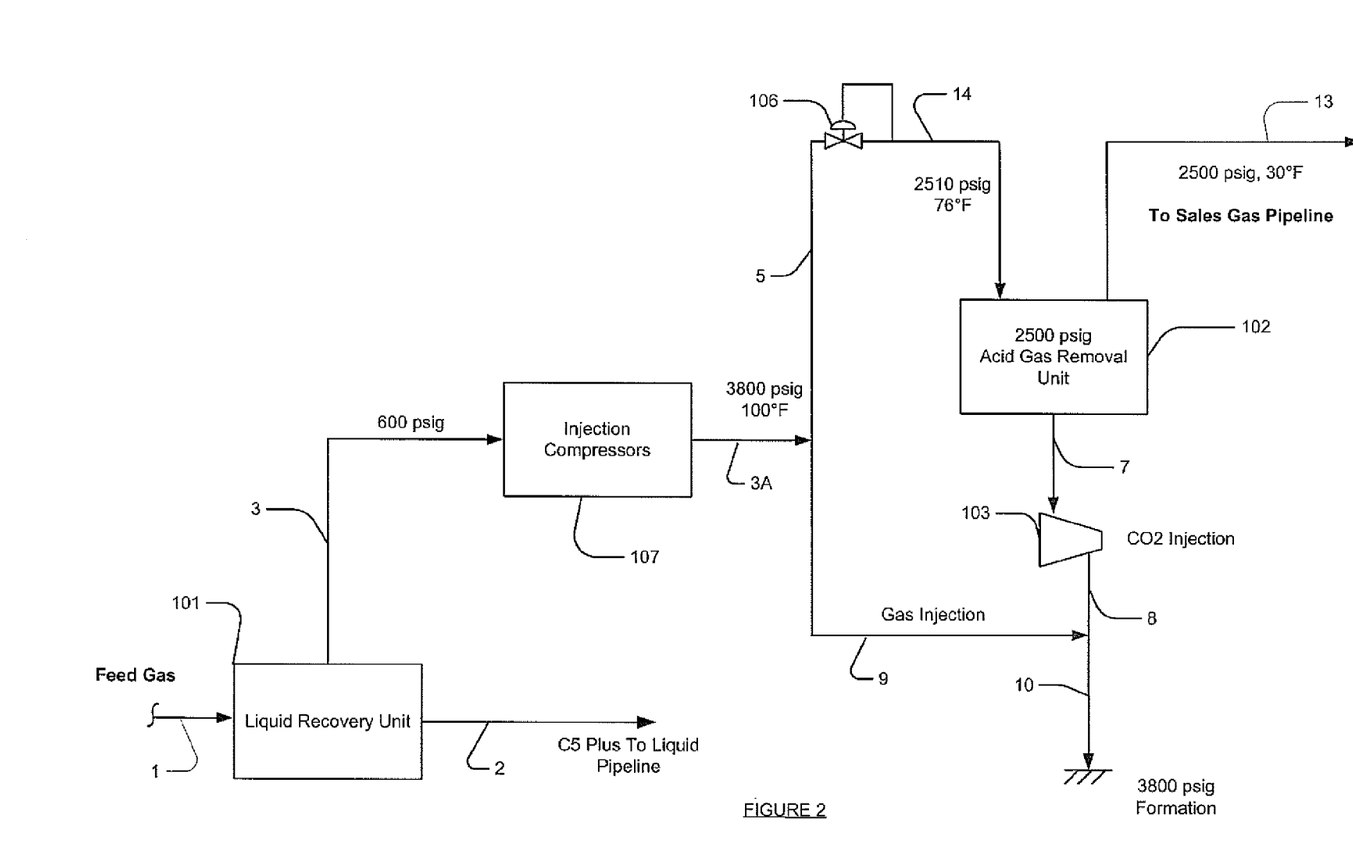
FIG. 2 is a schematic of an exemplary configuration in which integrated injection gas compression is followed by sales gas treating using a physical solvent absorption process at high pressure.

In contrast, as depicted in FIG. 2, a oil/gas facility has an exemplary configuration in which injection gas compression is followed by a sales gas treating unit using a physical solvent absorption process at high pressure, thereby rendering the associated gas flow rate independent from the rate of production of sales gas. With respect to the feed gas 1 and liquid recovery unit 101, the same configurations and considerations as described above apply Thus, a $C5^+$ liquid stream 2 leaves the plant via a liquid pipeline.

However, it should be appreciated that stream 3 (at about 600 psig) leaving the liquid recovery unit is typically not split into a sales gas branch and an injection gas branch. Therefore, all or almost all of the total flow of the dried and $C5^+$ depleted gas (stream 3) from the liquid recovery is compressed in the injection gas compressors 107, boosting the gas pressure from about 600 psig to about 3800 psig to form compressed stream 3A. Compressed stream 4 is then split into at least two streams 9 (injection gas branch) and 5 (sales gas branch). Under normal operating conditions, stream 9 is routed directly to the injection reservoir at a flow rate of 4 BSCFD. However, it should be recognized that the injection gas flow can be varied and can be increased up to 8 BSCFD when the sales gas market demand drops.

Stream 5, typically at a flow rate of 4 BSCFD is let down in pressure to about 2510 psig in the JT valve 106. The letdown gas (stream 14) is cooled by Joule-Thomson effect to about 76° F. and fed to the an acid gas removal unit 102 that employs a physical solvent (e.g., FLUOR SOLVENT ™) for carbon dioxide removal operating at about 2500 psig. Carbon dioxide leaves the acid gas removal unit as stream 7 is further compressed in compressor 103 to compressed stream 8 at about injection pressure. The so formed compressed $CO_2$ stream may then be combined with the injection gas stream 9 to form combines stream 10 that is injected into the hydrocarbon reservoir (i.e., the hydrocarbon reservoir formation).

It should be especially appreciated that, in contrast to all or almost all known amine processes, contemplated configurations operate at an elevated pressure using a physical solvent (or solvent comprising a physical solvent), which is particularly advantageous where the acid gas removal is performed at relatively high pressure because rich solvent loading of physical solvents increases proportionally to the acid gas partial pressure in the feed gas (Henry's Law). Consequently, a high acid gas partial pressure is especially beneficial as it will reduce the overall solvent circulation and energy consumption.

Still further, it should be recognized that physical solvent regeneration will typically not require external heat because such solvents can be regenerated by pressure letdown and flashing on the rich solvent. Moreover, flashed solvent regeneration provides cooling to the solvent via Joule-Thomson effect, thereby simultaneously removing the heat of absorption of the acid gases. Thus, external cooling in contemplated configurations is minimal, and may even be entirely avoided.

It should also be recognized that many physical solvents (e.g., FLUOR SOLVENT™) are non-aqueous solvents, and that such solvents are frequently hydroscopic. Consequently, treated gas from the solvent treating unit will be relatively dry and may therefore not require additional dehydration as generally required in known amine-based systems. Furthermore, due to the relatively low temperature operation in the flash regeneration process, the treated gas will be at a relatively low temperature that can transported via a sales gas pipeline in cold climate operation without further sales gas refrigeration.

Thus, using contemplated configurations according to the inventive subject matter, the removal rate of associated gas from the feed gas can be maintained at a relatively constant rate and will therefore not be dependent on sales gas market demand. When the sales gas market demand is low, more gas will be bypassed to the injection well, maintaining the necessary gas removal rate. As a result, contemplated processes are capable of maintaining a stable crude oil production independent of the sales gas market.

Figure 3:
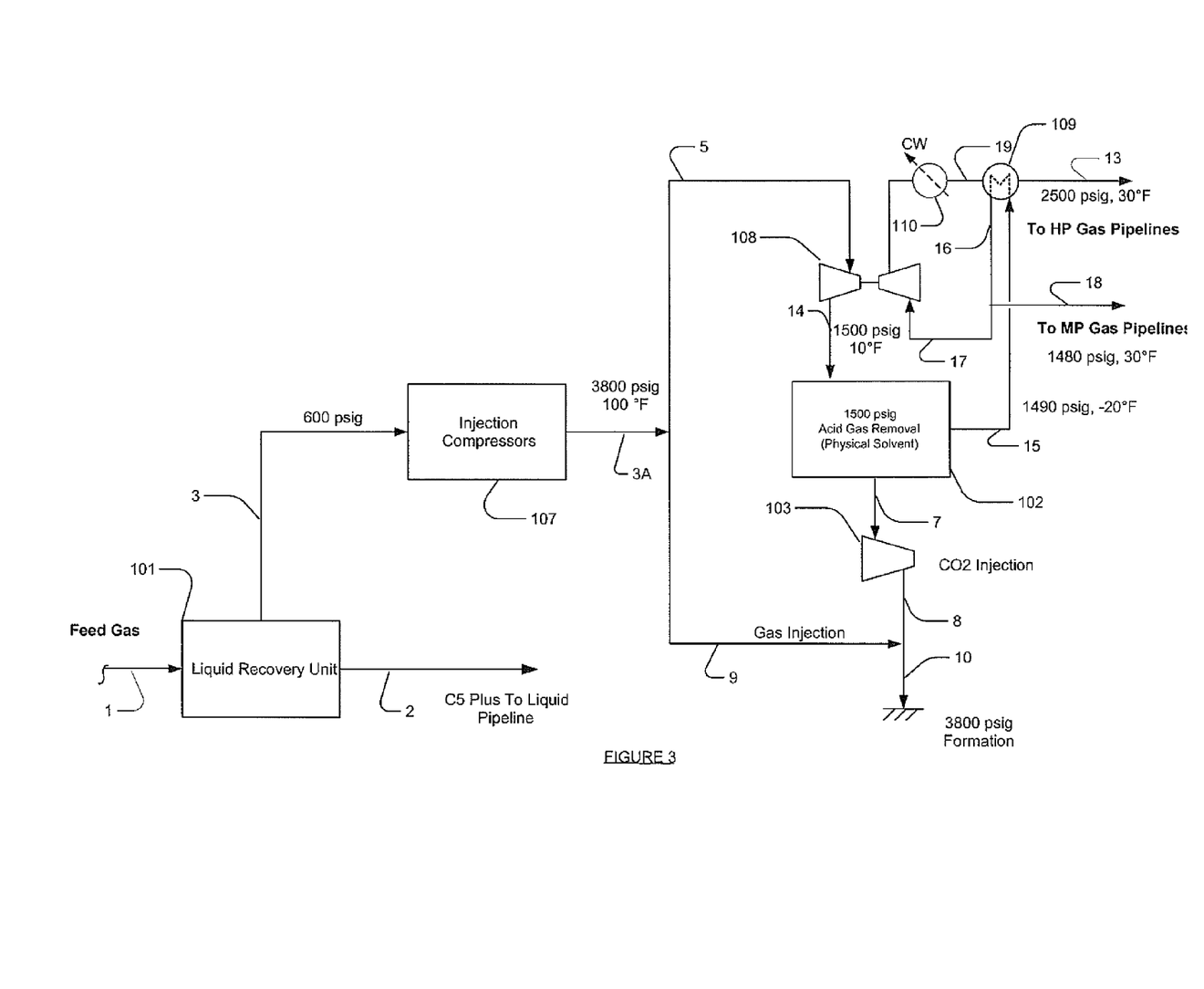
FIG. 3 is a schematic of an exemplary configuration in which integrated injection gas compression is followed by sales gas treating using a physical solvent absorption process at an intermediate pressure.

Alternatively, and especially where the sales gas is fed into a sales gas pipeline with intermediate pressure (e.g., 1500 psig), configurations are contemplated in which injection gas compression is followed by sales gas treating unit using a physical solvent absorption process at an intermediate pressure. FIG. 3 depicts an exemplary configuration in which a portion of the compressed gas from the injection compressors is treated with a physical solvent to remove at least a portion of the acid gas. Here, with respect to the feed gas 1 and liquid recovery unit 101, the same configurations and considerations as described above apply. Thus, a $C5^+$ liquid stream 2 leaves the plant via a liquid pipeline.

As already depicted in FIG. 2 above, stream 3 (at about 600 psig) leaving the liquid recovery unit is typically not split into a sales gas branch and an injection gas branch. Therefore, all or almost all of the total flow of the dried and $C5^+$ depleted gas (stream 3) from the liquid recovery is compressed in the injection gas compressors 107, boosting the gas pressure from about 600 psig to about 3800 psig to form compressed stream 3A. Compressed stream 3A is then split into at least two streams 9 (injection gas branch) and 5 (sales gas branch).

Stream 5 is then reduced in pressure by pressure letdown in a turbo expander 108 that produces an expanded gas (stream 14) at about 1500 psig and 10° F. The expanded gas is fed to the acid gas removal unit using a physical solvent for acid gas absorption operating at about 1500 psig. Again, use of a physical solvent process provides various advantages over known amine treating processes as described above. Furthermore, in such configurations the expanded gas stream 14 will have a temperature of about 10° F., thereby further reducing cooling requirements of the physical solvent absorption process. The treated gas (stream 15) from the acid gas removal unit 102 is typically at about 1490 psig and −20° F., wherein the refrigerant content of stream 15 is employed to cool the outlet stream 19 from expander/compressor after cooler 110 in a heat recovery exchanger 109. The heated gas stream 17 from exchanger 109 is further compressed by the expander compressor 108 to 2500 psig and cooled by aftercooler 110 to form stream 19 which is further cooled to stream 13 by heat recovery exchanger 109 to 30° F.

Such configurations may also (optionally or additionally) be employed to produce a second sales gas (stream 18) at an intermediate pressure (e.g., about 1500 psig), which may be produced directly from the acid gas removal unit prior to the expander compressor 108. With respect to the feed gas composition and the volume flows the same considerations as described above apply. The acid gas that is removed from the acid gas removal unit 102 leaves the removal unit as stream 7 and is compressed by injection compressor 103 for injection into the hydrocarbon reservoir. As already depicted in FIG. 2, the compressed acid stream 8 gas may be combined with the compressed injection gas stream 9.

In such configurations, gas injection and sales gas production is performed with the use of a turbo expander that allows the physical solvent absorption unit to operate at a pressure that is lower than the sales gas pipeline (The optimum absorption pressure of a physical solvent process depends on several factors such as the acid gas concentration in the feed gas, the physical and chemical properties of the solvent and the heat and mass transfer inside the solvent absorber at the operating pressure). Thus, the pressure required for optimum configuration and operation may also be lower than the sales gas pressure (e.g., about 1500 psig or lower).

Furthermore, contemplated configurations according to FIG. 3 will exhibit substantially the same advantages as contemplated configurations according to FIG. 2, and a particularly advantage includes a relatively constant removal rate of the associated gas, which is substantially independent from the sales gas market demand. For example, when the sales gas market is low, more associated gas is bypassed into the injection well. As a result, contemplated processes allow a relatively unchanged crude oil production despite a continuously changing sales gas market.

Figure 4:
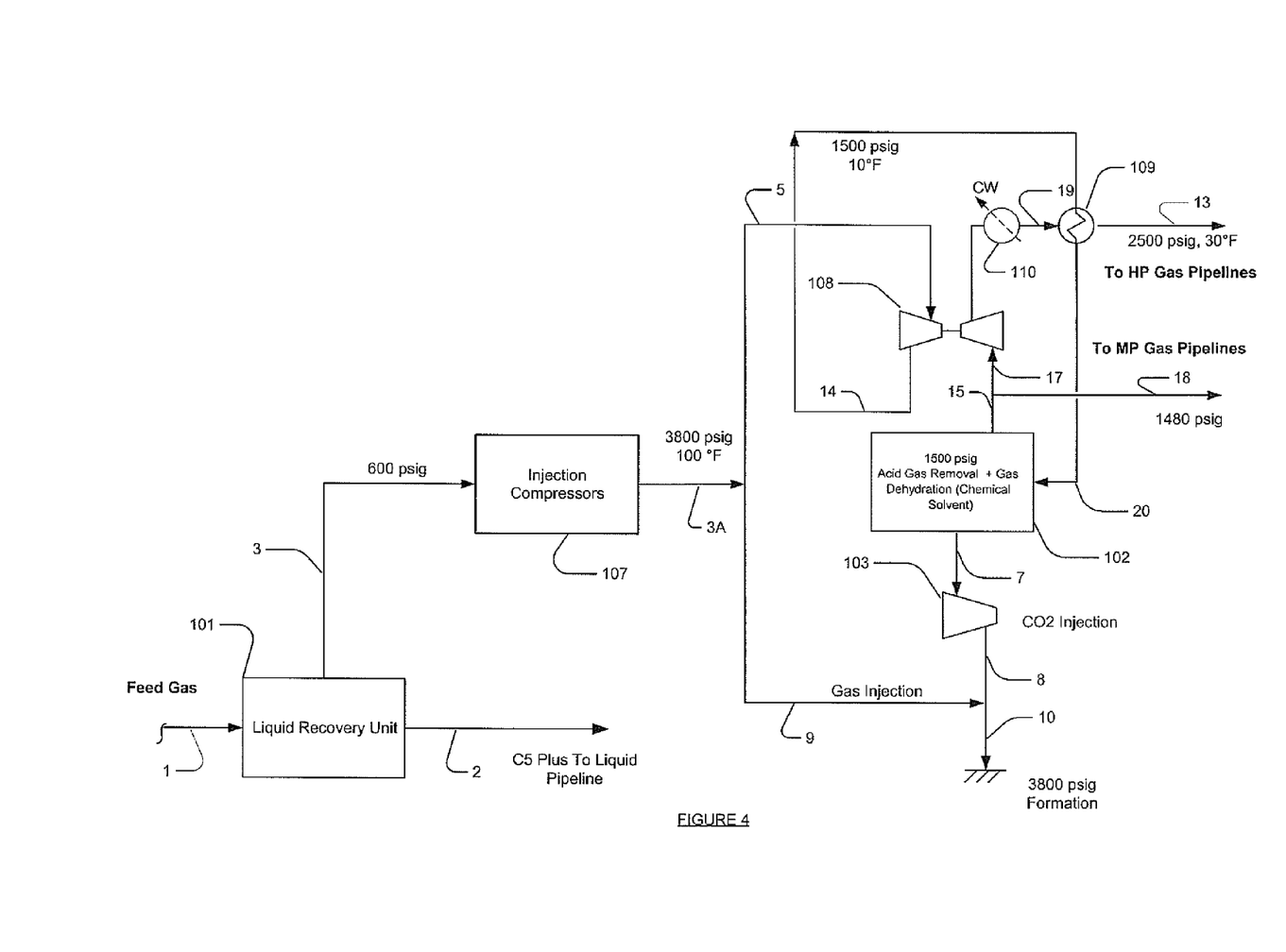
FIG. 4 is a schematic of an exemplary configuration in which integrated injection gas compression is followed by sales gas treating using a chemical solvent absorption/gas dehydration process at an intermediate pressure.

Alternatively, contemplated configurations may be modified to employ a chemical solvent for acid gas removal (e.g., using activated and/or formulated MDEA). FIG. 4 depicts an exemplary configuration in which a portion of the compressed gas from the injection compressors is treated with activated MDEA solvent to remove at least some of the acid gas. Here, with respect to the feed gas 1 and liquid recovery unit 101, the same configurations and considerations as described above apply. Thus, a C5$^+$ liquid stream 2 leaves the plant via a liquid pipeline.

Stream 3 (at about 600 psig) leaving the liquid recovery unit is typically not split into a sales gas branch and an injection gas branch. Therefore, all or almost all of the total flow of the dried and C5$^+$ depleted gas (stream 3) from the liquid recovery is compressed in the injection gas compressors 107, boosting the gas pressure from about 600 psig to about 3800 psig to form compressed stream 3A. Compressed stream 3A is then split into at least two streams 9 (injection gas branch) and 5 (sales gas branch).

Stream 5 is reduced in pressure by pressure letdown in a turbo expander 108 that produces an expanded gas (stream 14) at about 1500 psig and 10° F. The refrigerant content of the expanded gas (Stream 14) may then be used to provide cooling for stream 19, the outlet stream from the expander compressor aftercooler 110. In exchanger 109, stream 19 is cooled to 30° F. (stream 13) for pipeline transmission while stream 14 is heated to about 100° F. to 130° F. (stream 20) before being fed to the acid gas removal unit 102 operating at about 1500 psig. Of course, it should be recognized that the feed temperature to the amine absorber can be varied by this exchange configuration to meet the optimum operating conditions considering the solvent's chemical and physical properties, concentrations and the heat and mass transfer performance in the absorber.

When compared to other amines (primary or secondary amines) in an acid gas removal unit, the use of an activated MDEA generally requires less circulation, heating and cooling duties due to the fact that a higher amine loading can be achieved with MDEA. However, when compared to the physical solvent processes in the previous configurations, the activated MDEA process operates at a higher temperature and requires higher heating and cooling duties. In addition, the treated gas from the MDEA absorber is saturated with water and requires further gas dehydration (in order to avoid condensation in pipeline) prior to being compressed by the expander compressor 108 to pipeline pressure.

Such configurations may also (optionally or additionally) be employed to produce a second sales gas (stream 18) at an intermediate pressure (e.g., about 1500 psig), which may be produced directly from the acid gas removal unit prior to the expander compressor 108 (e.g., from stream 15). The treated gas from acid gas removal unit 102 (stream 17) is then compressed to the desired high pressure (here: about 2500 psig). With respect to the feed gas composition and the volume flows the same considerations as described above apply. The acid gas that is removed from the acid gas removal unit 102 leaves the removal unit as stream 7 and is dried and compressed by CO2 injection compressor 103 for injection into the hydrocarbon reservoir. As already depicted in FIG. 2, the compressed acid gas stream 8 may be combined with the compressed injection gas stream 9 to form combined injection gas stream 10.

In such configurations gas injection and sales gas production is performed with the use of a turbo expander that allows the MDEA absorption unit to operate at a pressure that is lower than the sales gas pipeline. (The optimum absorption pressure of a MDEA process depends on several factors, including the acid gas concentration in the feed gas, the physical and chemical properties of the solvent and the heat and mass transfer inside the solvent absorber at the operating pressure, etc.). Thus, the pressure required for optimum configuration and operation may also be lower than the sales gas pressure (e.g., about 1500 psig or lower).

It should be particularly recognized that contemplated configurations according to FIG. 4 will exhibit substantially the same advantages as contemplated configurations according to FIG. 2 or 3. Among other things, the removal rate of the associated gas will be substantially independent from the sales gas market demand. For example, when the sales gas market is low, more associated gas is bypassed into the injection well. As a result, contemplated processes allow a relatively unchanged crude oil production despite a continuously changing sales gas market.

With respect to gas streams (stream 1), it is generally contemplated that numerous natural and synthetic gases are appropriate. However, particularly preferred gases include associated gas from oil production after C5$^+$ components have been removed, and especially associated gas with a carbon dioxide content that is at least about 5 mol %, more typically at least 10 about mol %, and most typically at least 10 to 20 mol %. Therefore, particularly suitable feed streams include natural gas feed streams from oil and gas fields located in Alaska, Norway, Southeast Asia, and the Gulf of Mexico. A typical feed gas composition is given in the table below:

| COMPONENT | MOL % |
| --- | --- |
| $N_2$ | 0.6 |
| $CO_2$ | 14.50 |
| $H_2S$ | 100 ppm |

-continued

| COMPONENT | MOL % |
|---|---|
| C1 | 78.3 |
| C2 | 4.9 |
| C3 | 1.4 |
| C4 | 0.2 |
| C5+ | 0.1 |

Similarly, numerous physical solvents may be employed in contemplated configurations, and it is generally contemplated that the solvent in the acid gas removal unit may or may not exhibit specificity towards a particular acid gas. Consequently, particularly suitable solvents include FLUOR SOLVENT™ (propylene carbonate), MORPHYSORB™ (a morpholine solvent), and SELEXOL™ (a dimethylether of polyethylene glycol). Other acid gas removal solvents that are particularly suitable to be used in contemplated configurations include activated MDEA, formulated MDEA and other amine solvents.

Thus, it is contemplated that in one aspect of the inventive subject matter a plant may include an acid gas removal unit that receives a portion of the dehydrated and C5+ depleted gas from an injection gas compressor at a pressure above a pipeline pressure (e.g., high-pressure pipelines of at least 2300 psig), wherein the dehydrated and $C5^+$ depleted gas comprises a sales gas and an acid gas, and wherein the acid gas is removed by a physical solvent or chemical solvent in the acid gas removal unit.

In particularly preferred aspects of such plants, the dehydrated and $C5^+$ depleted gas has a carbon dioxide content of at least 10 mol % and a water dew point of about $-40°$ F. However, in alternative configurations, the carbon dioxide content may vary considerably (see above), and it is especially preferred that the dehydrated and C5+ depleted gas may further be $C4^+$ depleted. Moreover, it should be appreciated that the $C5^+$ depleted gas is let down in pressure to about pipeline pressure (e.g. via JT valve or turbo expander) before the acid gas is removed in the acid gas removal unit, and it is especially preferred that the dehydrated and C5+ depleted gas is let down in a turbo expander to a pressure at which the acid gas removal unit operates.

Thus, for configurations where the pipeline pressure is about 1500 psig or about 2500 psig, the acid gas removal unit will be operated at similar or substantially same pressure. Consequently, it should be appreciated that the pressure at which the acid gas removal unit operates is lower than the pipeline pressure, but above the pressure at which the gas enters the injection compressors (which is typically at about 600 psig). Consequently, and especially where the acid gas removal unit operates at an intermediate pressure (e.g. at about 1500 psig), it is contemplated that the $C5^+$ depleted gas that leaves the acid gas removal unit may be compressed to pipeline pressure (e.g. 2500 psig) by power generated from the turbo expander (that reduced the pressure of the gas after the injection gas compressors and before the acid gas removal unit). Furthermore, it should be recognized that the refrigerant content of the $C5^+$ depleted gas that leaves the acid gas removal unit may advantageously be used as a refrigerant (e.g., to cool the sales gas).

In yet further particularly preferred configurations, a bypass will receive at least a portion of the dehydrated and $C5^+$ depleted gas from the injection gas compressor at a pressure above pipeline pressure that is subsequently injected to a reservoir formation. With respect to the volume flow through such bypass lines, it should be recognized that the volume of flow may be varied during operation of the plant to adjust for fluctuations in the sales gas demand. Therefore, when the sales gas demand is relatively high, a relatively small fraction of the dehydrated and $C5^+$ depleted gas from the injection gas compressor is injected into the formation. On the other hand, when the sales gas demand is relatively low, it is contemplated that the fraction of the dehydrated and $C5^+$ depleted gas may be up to 100% of the total flow rate of the dehydrated and $C5^+$ depleted gas. Therefore, it should be appreciated that the flow of sales gas and with that the production rate of crude hydrocarbon product may be varied without a concomitant change in the flow rate of the production rate of crude hydrocarbon product.

Viewed from another perspective, flexibility in operation with respect to varying demand of sales gas may be achieved by providing an injection gas compression unit that receives a dehydrated gas comprising an acid gas and compresses the dehydrated gas to an injection pressure, thereby forming a compressed gas. An acid gas removal unit receives a first portion of the compressed gas, wherein at least some of the acid gas is removed in the acid gas removal unit at at least pipeline pressure using a physical solvent, or chemical solvent to form a sales gas, and the sales gas is fed to a pipeline, the removed acid gas is compressed and injected to a reservoir formation, and wherein optionally a second portion of the compressed gas is injected to the reservoir formation for disposal or enhanced oil recovery. With respect to the dehydrated gas, the sales gas pipeline pressure, and the physical solvent or chemical solvent, the same considerations as contemplated above apply.

Alternatively, contemplated plants may include a hydrocarbon source that provides at a production rate a crude hydrocarbon product and an associated gas comprising a sales gas and an acid gas. An injection gas compression unit in such plants will receive and compress at least a portion of the associated gas, thereby producing a compressed associated gas, and an acid gas removal unit maybe fluidly coupled to the injection gas compression unit and receive at least part of the compressed associated gas via JT valve or turbo expander, thereby separating the acid gas from the sales gas. Contemplated plants may further include a bypass that is fluidly coupled to the injection gas compression unit and receives a portion of the compressed associated gas, thereby rendering the production rate of the crude hydrocarbon product independent from the flow rate of the sales gas. Particularly preferred plant may include an oil/gas production facility in which the associated gas is dehydrated and $C5^+$ depleted to form a treated gas with a carbon dioxide content of at least 10 mol % and a water dew point of about $-40°$ F. As already described above, it is generally preferred that the injection gas compression unit in such plants compresses the treated gas to a pressure above a sales gas pipeline pressure (and preferably to a pressure of at least 3500 psig), and that the acid gas removal unit operates at or below a pressure of about sales gas pipeline pressure (which may be about 1500 psig or 2500 psig).

Thus, specific embodiments and applications of configurations and methods for high pressure gas processing have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising an acid gas removal unit that receives a portion of dehydrated and $C5^+$ depleted gas from an injection gas compressor at a pressure above a pipeline pressure, wherein the dehydrated and $C5^+$ depleted gas comprises a sales gas and an acid gas, and wherein the acid gas is removed by a physical solvent or a chemical solvent in the acid gas removal unit.

2. The plant of claim 1 wherein the dehydrated and $C5^+$ depleted gas has a carbon dioxide content of at least 10 mol % and a water dew point of about $-40°$ F.

3. The plant of claim 2 wherein the dehydrated and $C5^+$ depleted gas is further $C4^+$ depleted.

4. The plant of claim 1 wherein the physical solvent is selected from the group of propylene carbonate, a morpholine solvent, and a dimethylether of polyethylene glycol, and wherein the chemical solvent comprises MDEA.

5. The plant of claim 1 wherein the pipeline pressure is at least 2300 psig.

6. The plant of claim 1 wherein the dehydrated and $C5^+$ depleted gas is let down in pressure to about pipeline pressure before the acid gas is removed in the acid gas removal unit.

7. The plant of claim 1 wherein the dehydrated and $C5^+$ depleted gas is let down in a turbo expander to a pressure at which the acid gas removal unit operates.

8. The plant of claim 7 wherein the pressure at which the acid gas removal unit operates is lower than the pipeline pressure.

9. The plant of claim 8 wherein the $C5^+$ depleted gas that leaves the acid gas removal unit is compressed to the pipeline pressure by power generated from the turbo expander.

10. The plant of claim 8 wherein the $C5^+$ depleted gas that leaves the acid gas removal unit is used as a refrigerant.

11. The plant of claim 1 further comprising a bypass that receives a portion of the dehydrated and $C5^+$ depleted gas from the injection gas compressor at a pressure above pipeline pressure, and wherein the portion of the dehydrated and $C5^+$ depleted gas is injected to a reservoir formation.

12. The plant of claim 11 wherein the portion of the dehydrated and $C5^+$ depleted gas is up to 100% of a total flow rate of the dehydrated and $C5^+$ depleted gas.

13. The plant of claim 1 wherein the acid gas that is removed by the acid gas removal unit is compressed and injected to a reservoir formation.

14. A plant comprising:
an injection gas compression unit that receives a dehydrated gas comprising an acid gas and compresses the dehydrated gas to an injection pressure, thereby forming a compressed gas;
an acid gas removal unit that receives a first portion of the compressed gas, wherein at least some of the acid gas is removed in the acid gas removal unit at at least pipeline pressure using a physical solvent or chemical solvent to form a sales gas; and
wherein the sales gas is fed to a pipeline, the removed acid gas is compressed and injected to a reservoir formation, and wherein optionally a second portion of the compressed gas is injected to the reservoir formation for disposal or enhanced oil recovery.

15. The plant of claim 14 wherein the dehydrated gas is $C5^+$ depleted, has a carbon dioxide content of at least 10 mol %, and a water dew point of about $-40°$ F.

16. The plant of claim 14 wherein the pipeline pressure is at least 2300 psig.

17. The plant of claim 14 wherein the physical solvent is selected from the group of propylene carbonate, a ruorpholine solvent, and a dimethylether of polyethylene glycol.

18. The plant of clam 14 wherein the first portion of the compressed injection gas is let down in pressure to about pipeline pressure, and wherein the second portion of the compressed gas has a pressure above pipeline pressure.

19. A plant comprising:
a hydrocarbon source that provides at a production rate a crude hydrocarbon product and an associated gas comprising a sales gas and an acid gas;
an injection gas compression unit receiving and compressing at least a portion of the associated gas, thereby producing a compressed associated gas;
an acid gas removal unit fluidly coupled to the injection gas compression unit and receiving at least part of the compressed associated gas via JT valve or turbo expander, thereby separating the acid gas from the sales gas; and
a bypass fluidly coupled to the injection gas compression unit and receiving a portion of the compressed associated gas and thereby rendering the production rate of the crude hydrocarbon product independent from a flow rate of the sales gas.

20. The plant of claim 19 further comprising a oil/gas production facility in which the associated gas is dehydrated and C5+ depleted to form a treated gas with a carbon dioxide content of at least 10mol % and a water dew point of about $-40°$ F.

21. The plant of claim 20 wherein the injection gas compression unit compresses the treated gas to a pressure above a sales gas pipeline pressure.

22. The plant of claim 21 wherein the pressure above sales gas pipeline pressure is at least 3500 psig.

23. The plant of claim 19 wherein the acid gas removal unit operates at a pressure of about sales gas pipeline pressure.

24. The plant of claim 19 wherein the acid gas removal unit operates at a pressure that is below a sales gas pipeline pressure.

25. The plant of claim 19 wherein the acid gas removal unit employs a physical solvent or chemical solvent to remove at least a portion of the acid gas.

* * * * *